US012179158B1

(12) United States Patent
Solovyeva et al.

(10) Patent No.: US 12,179,158 B1
(45) Date of Patent: Dec. 31, 2024

(54) MIXED MATRIX MEMBRANES CONTAINING COVALENT TRIAZINE FRAMEWORKS

(71) Applicant: Saudi Arabian Oil Company, Dhahran (SA)

(72) Inventors: Vera Solovyeva, Moscow (RU); Elena Pankratova, Moscow (RU); Hassan Sakar Alqahtani, Dammam (SA); Khalid Alruwaili, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/638,505

(22) Filed: Apr. 17, 2024

(51) Int. Cl.
| | | |
|---|---|---|
| B01D 71/82 | (2006.01) |
| B01D 67/00 | (2006.01) |
| B01D 69/14 | (2006.01) |
| B01D 71/32 | (2006.01) |
| B01D 71/44 | (2006.01) |
| B01D 71/58 | (2006.01) |

(52) U.S. Cl.
CPC ......... *B01D 71/82* (2013.01); *B01D 67/0006* (2013.01); *B01D 67/00113* (2022.08); *B01D 67/0095* (2013.01); *B01D 69/1411* (2022.08); *B01D 69/147* (2013.01); *B01D 71/32* (2013.01); *B01D 71/44* (2013.01); *B01D 71/58* (2013.01); *B01D 2257/504* (2013.01); *B01D 2323/36* (2013.01)

(58) Field of Classification Search
None
See application file for complete search history.

(56) References Cited

U.S. PATENT DOCUMENTS

| | | |
|---|---|---|
| 7,485,173 B1 | 2/2009 | Liu et al. |
| 8,132,678 B2 | 3/2012 | Liu et al. |
| 8,678,203 B2 | 3/2014 | Knapp et al. |
| 10,188,981 B2 | 1/2019 | Al-Maythalony et al. |

(Continued)

FOREIGN PATENT DOCUMENTS

| | | |
|---|---|---|
| AU | 2013353326 | 7/2017 |
| CA | 2551497 | 2/2013 |
| CA | 2551499 | 4/2013 |

(Continued)

OTHER PUBLICATIONS

Wang et al., "Recent advances in developing mixed matrix membranes based on covalent organic frameworks," Separation and Purification Technology 301 (2022) 122004 (Year: 2022).*

(Continued)

*Primary Examiner* — Krishnan S Menon
(74) *Attorney, Agent, or Firm* — Fish & Richardson P.C.

(57) ABSTRACT

A method of synthesizing a mixed matrix membrane (MMM) film. The method includes: synthesizing a polymer including a polynorbornene or a polytricyclononene; synthesizing covalent-triazine frameworks (CTFs); preparing a polymer solution by dissolving the polymer in a first solvent; preparing a filler solution by dispersing the CTFs in a second solvent; adding the polymer solution to the filler solution while stirring the filler solution, forming a casting solution; pouring the casting solution into a membrane support; and drying the poured casting solution in the membrane support to form the MMM film including the CTFs.

20 Claims, 10 Drawing Sheets

(56) References Cited

U.S. PATENT DOCUMENTS

| | | |
|---|---|---|
| 2021/0016245 A1 | 1/2021 | Pahwa et al. |
| 2021/0331122 A1 | 10/2021 | Li-Oakey et al. |

FOREIGN PATENT DOCUMENTS

| | | | |
|---|---|---|---|
| CN | 111701458 | | 9/2020 |
| KR | 102029451 | | 10/2019 |
| KR | 20220131454 | A * | 9/2022 |
| RU | 2522555 | | 7/2014 |
| RU | 2634724 | | 11/2017 |
| WO | WO 2015129925 | | 9/2015 |
| WO | WO 2023007201 | | 2/2023 |

OTHER PUBLICATIONS

Alentiev et al., "Polynorbornenes bearing ether fragments in substituents: Promising membrane materials with enhanced CO2 permeability," Journal of Membrane Science, Apr. 2022, 648:1-15, 15 pages.

Allan et al., "Energy Transition: Optimizing Existing E&P Value and Clean Energy Potential," Presented at the SPE Annual Technical Conference and Exhibition, Dubai, UAE, Sep. 2021, 17 pages.

Azhari et al., "Methanol synthesis from CO2: A mechanistic overview," Results in Engineering, Dec. 2022, 16(100711):1-19, 19 pages.

Bahmanpour et al., "Recent progress in syngas production via catalytic CO2 hydrogenation reaction," Applied Catalysis B: Environmental, Oct. 2021, 295(120319):1-11, 11 pages.

Bugel et al., "Biphenyl-based covalent triazine framework/matrimid® mixed-matrix membranes for CO2/CH4 separation," Membranes, Oct. 2021, 11(795):1-11, 11 pages.

Bugel et al., "Covalent triazine framework CTF-fluorene as porous filler material in mixed matrix membranes for CO2/CH4 separation," Microporous and Mesoporous Materials, Mar. 2021, 316(110941):1-8, 8 pages.

Buyukcakir et al., "Charged Covalent Triazine Frameworks for CO2 Capture and Conversion," ACS Applied Materials & Interfaces, Feb. 2017, 9(8):7209-7216, 8 pages.

Cao et al., "Reactive Transport Modeling of Anthropogenic Carbon Mineralization in Stacked Columbia River Basalt Reservoirs," Presented at the SPE/AAPG/SEG Unconventional Resources Technology Conference, Denver, Colorado, USA, Jun. 2023, 8 pages.

Chan et al., "CO2 Removal from Natural Gas Using Membrane Contactor," Prepared for presentation at the Offshore Technology Conference Asia held in Kuala Lumpur, Malaysia, Mar. 25-28, 2014, 7 pages.

Dey et al., "Synthesis and Characterization of Covalent Triazine Framework CTF-1@Polysulfone Mixed Matrix Membranes and Their Gas Separation Studies," Front. Chem., Oct. 2019, 7(693):1-8, 8 pages.

Dujardin et al., "Polyvinylnorbornene Gas Separation Membranes," Polymers, Apr. 2019, 11(704):1-15, 15 pages.

Finkelshtein et al., "Substituted polynorbornenes as promising materials for gas separation membranes," Russian Chemical Reviews, 2011, 80(4):341-361, 21 pages.

Fu et al., "Functionalized Covalent Triazine Frameworks for Effective CO2 and SO2 Removal," ACS Appl. Mater. Interfaces, Oct. 2018, 10(42):36002-36009, 8 pages.

Gmernicki et al., "Accessing Siloxane Functionalized Polynorbornenes via Vinyl-Addition Polymerization for CO2 Separation Membranes," ACS Macro Lett., Jul. 2016, 5(7):879-883, 5 pages.

Guseva et al., "Polymers based on exo-silicon-substituted norbornenes for membrane gas separation," Journal of Membrane Science, Nov. 2021, 638(119656):1-15, 15 pages.

Hillock et al., "Crosslinked mixed matrix membranes for the purification of natural gas: Effects of sieve surface modification," Journal of Membrane Science, Apr. 2008, 314(1-2):193-199, 7 pages.

iea.blob.core.windows.net [online], "Emissions from Oil and Gas Operations in Net Zero Transitions—A World Energy Outlook Special Report on the Oil and Gas Industry and COP28," Jun. 2023, retrieved on May 20, 2024, retrieved from URL <https://iea.blob.core.windows.net/assets/2f65984e-73ee-40ba-a4d5-bb2e2c94cecb/EmissionsfromOilandGasOperationinNetZeroTransitions.pdf>, 33 pages.

Jiang et al., "Mixed-Matrix Membranes with Covalent Triazine Framework Fillers in Polymers of Intrinsic Microporosity for CO2 Separations," Ind. Eng. Chem. Res., Oct. 2019, 59(12):5296-5306, 11 pages.

Liang et al., "Green synthesis of graphite from CO2 without graphitization process of amorphous carbon," Nature Communications, Jan. 2021, 12(119):1-9, 9 pages.

Liao et al., "Advances in the Synthesis of Covalent Triazine Frameworks," ACS Omega, Jan. 2023, 8(5):4527-4542, 16 pages.

Liu et al., "Origin and evolution of a CO2-Rich gas reservoir offshore Angola: Insights from the Gas Composition and isotope analysis," Applied Geochemistry, Jan. 2023, 148(105552):1-10, 10 pages.

Middleton et al., "CO2 as a fracturing fluid: Potential for commercial-scale shale gas production and CO2 sequestration," Energy Procedia, 2014, 63:7780-7784, 5 pages.

Mukherjee et al., "Dual Strategic Approach to Prepare Defluorinated Triazole-Embedded Covalent Triazine Frameworks with High Gas Uptake Performance," Chem. Mater., May 2019, 31(11):3929-3940, 12 pages.

Mukhtar et al., "Impact of amine functionality on the selective CO2/CH4 adsorption behavior of porous covalent triazine adsorbent," Journal of Natural Gas Science and Engineering, Nov. 2020, 10 pages.

Mukhtar et al., "Synthesis-structure-property relationship of nitrogen-doped porous covalent triazine frameworks for pre-combustion CO2 capture," Energy, Nov. 2020, 216(119230):1-17, 17 pages.

Muller et al., "Sabatier-based CO2-methanation by catalytic conversion," Environmental Earth Science, Jul. 2013, 70:3771-3778, 8 pages.

Nasr-El-Din et al., "Stimulation of Deep Gas Wells Using HCl/Formic Acid System: Lab Studies and Field Application," Presented at the Canadian International Petroleum Conference, Calgary, Alberta, Jun. 2002, 22 pages.

Shan et al., "Mixed-matrix membranes containing an azine-linked covalent organic framework: Influence of the polymeric matrix on post-combustion CO2-capture," Journal of Membrane Science, Mar. 2018, 549:377-384, 8 pages.

Snæbjörnsdóttir et al., "Carbon dioxide storage through mineral carbonation," Nature Reviews Earth & Environment, Jan. 2020, 1:90-102, 13 pages.

Thankamony et al., "Porous covalent triazine piperazine polymer (CTPP)/PEBAX mixed matrix membranes for CO2/N2 and CO2/CH4 separations," Journal of Membrane Science, Dec. 2019, 591(117348):1-8, 8 pages.

Thompson et al., "Mixed-linker zeolitic imidazolate framework mixed-matrix membranes for aggressive CO2 separation from natural gas," Microporous and Mesoporous Materials, Jul. 2014, 192:43-51, 9 pages.

Torres et al., "Comparative analysis of absorption, membrane, and hybrid technologies for CO2 recovery," Journal of Natural Gas Science and Engineering, Oct. 2021, 94(104082):1-8, 8 pages.

Wang et al., "A fluorine-containing hydrophobic covalent triazine framework with excellent selective CO2 capture performance," J. Mater. Chem. A, Mar. 2018, 6:6370-6375, 6 pages.

Wang et al., "Enhanced Separation Performance for CO2 Gas of Mixed-Matrix Membranes Incorporated with TiO2/Graphene Oxide: Synergistic Effect of Graphene Oxide and Small TiO2 Particles on Gas Permeability of Membranes," Ind. Eng. Chem. Res., Jul. 2017, 56(31):8981-8990, 10 pages.

Wang et al., "Substituted polynorbornene membranes: a modular template for targeted gas separations," Polym. Chem., Apr. 2021, 2:2947-2977, 31 pages.

Wang et al., "Vinyl-Addition Fluoroalkoxysilyl-Substituted Polynorbornene Membranes for CO2/CH4 Separation," ACS Appl. Polym. Mater., Feb. 2022, 4(11):7976-7988, 13 pages.

(56) References Cited

OTHER PUBLICATIONS

Zhu et al., "Bipyridinium-Based Ionic Covalent Triazine Frameworks for $CO_2$, $SO_2$, and NO Capture," ACS Appl. Mater. Interfaces, Jan. 2020, 12(7):8614-8621, 8 pages.

* cited by examiner

MIXED MATRIX MEMBRANES CONTAINING COVALENT TRIAZINE FRAMEWORKS

TECHNICAL FIELD

This disclosure relates to mixed matrix membranes (MMM) containing covalent triazine frameworks (CTFs).

BACKGROUND

With the rising concerns of climate change and greenhouse gas emissions, governments and companies are looking for ways to reduce their energy intensity and carbon footprint. Because the rising atmospheric carbon dioxide ($CO_2$) concentration has been reported as a major factor of climate change, various approaches are needed to reduce the $CO_2$ emissions form industry. Such approaches include $CO_2$ separation, transportation, and sequestration.

SUMMARY

This disclosure describes technologies relating to mixed matrix membranes (MMM) containing covalent triazine frameworks (CTFs) and the preparation thereof.

BRIEF DESCRIPTION OF DRAWINGS

FIGS. 8-10 are steps of a synthesis of a polytricyclononene with an alkoxysilane group, wherein

DETAILED DESCRIPTION

Implementations described herein provide mixed matrix membranes (MMM) containing covalent triazine frameworks (CTFs) and the preparation thereof. In this disclosure, any MMM containing CTFs as a filler dispersed in a polymer matrix is referred to as CTFs-containing MMM (CTF-MMM).

Generally, membrane gas separation offers various advantages over traditional absorption, adsorption, and cryogenic distillation due to less energy consumption and better ecological characteristics. $CO_2$ separation from natural gas can be performed by membrane gas separation using $CO_2$-selective membranes that selectively permeates $CO_2$ while rejecting other gas components such as methane ($CH_4$) and other hydrocarbons. Various types of polymer materials such as cellulose acetate, polyimides, polysulfone, and others are developed for such membranes with $CO_2$ selectivity and permeability. However, pure polymers have reached the selectivity/permeability trade-off, known as Robeson's upper bound, which led to development of a composite membrane made of multiple components. Engineering of mixed matrix membranes (MMM) is a new step in the evolution of membrane technology to further advance the membrane performance. MMM includes a polymer matrix and porous fillers. Appropriate material selection for both polymer matrix and porous fillers is fundamentally important for the development of a highly efficient MMM.

In various implementations, the CTF-MMM in this disclosure includes substituted polynorbornenes or polytricyclononenes as the polymer matrix and CTFs as the porous fillers. The specific polymer structure for the polymer matrix and the design of the CTFs can be selected from a wide variety of chemically diverse structures. The selections of materials for polymer matrix and porous fillers can be made to optimize the balance between the $CO_2/CH_4$ selectivity and the gas permeability. The CTF-MMM described in this disclosure can be prepared by separately synthesizing the polymer matrix, e.g., polynorbornene, and the porous fillers, e.g., CTFs, and dispersing the porous fillers in the polymer matrix. The prepared CTF-MMM can exhibit high chemical and thermal stability, which offer benefits in $CO_2$ separation from natural gas at wellhead or other oil and gas production facilities. Further, the organic chemical nature of the porous fillers is compatible with organic polymer matrix and does not cause interfacial defects upon blending with polymer matrix.

Figure 14:
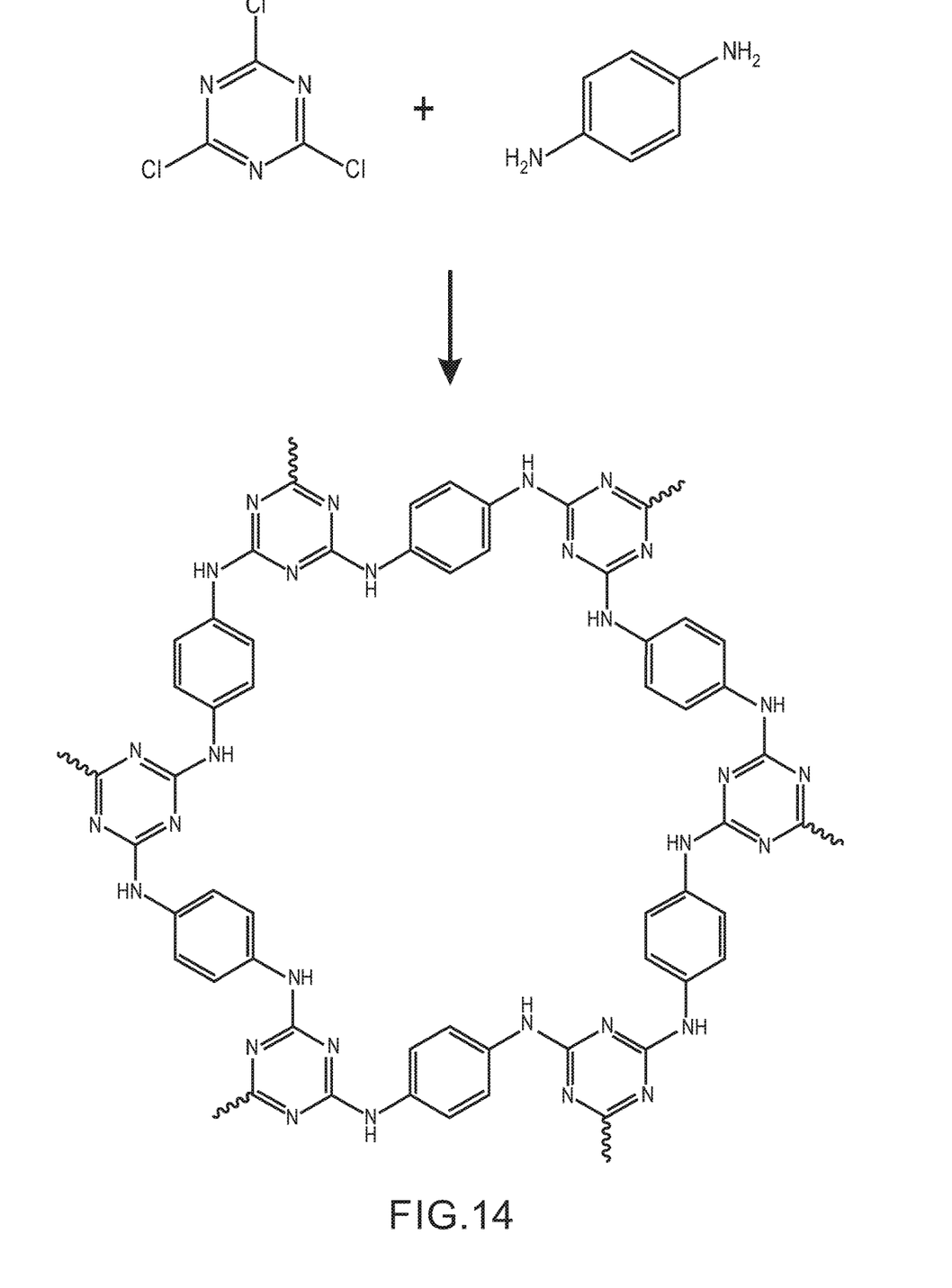
FIG. 14 is a synthesis of CTFs by condensation of cyanuric chloride and 1,4-phenylenediamine.
Figure 15A:
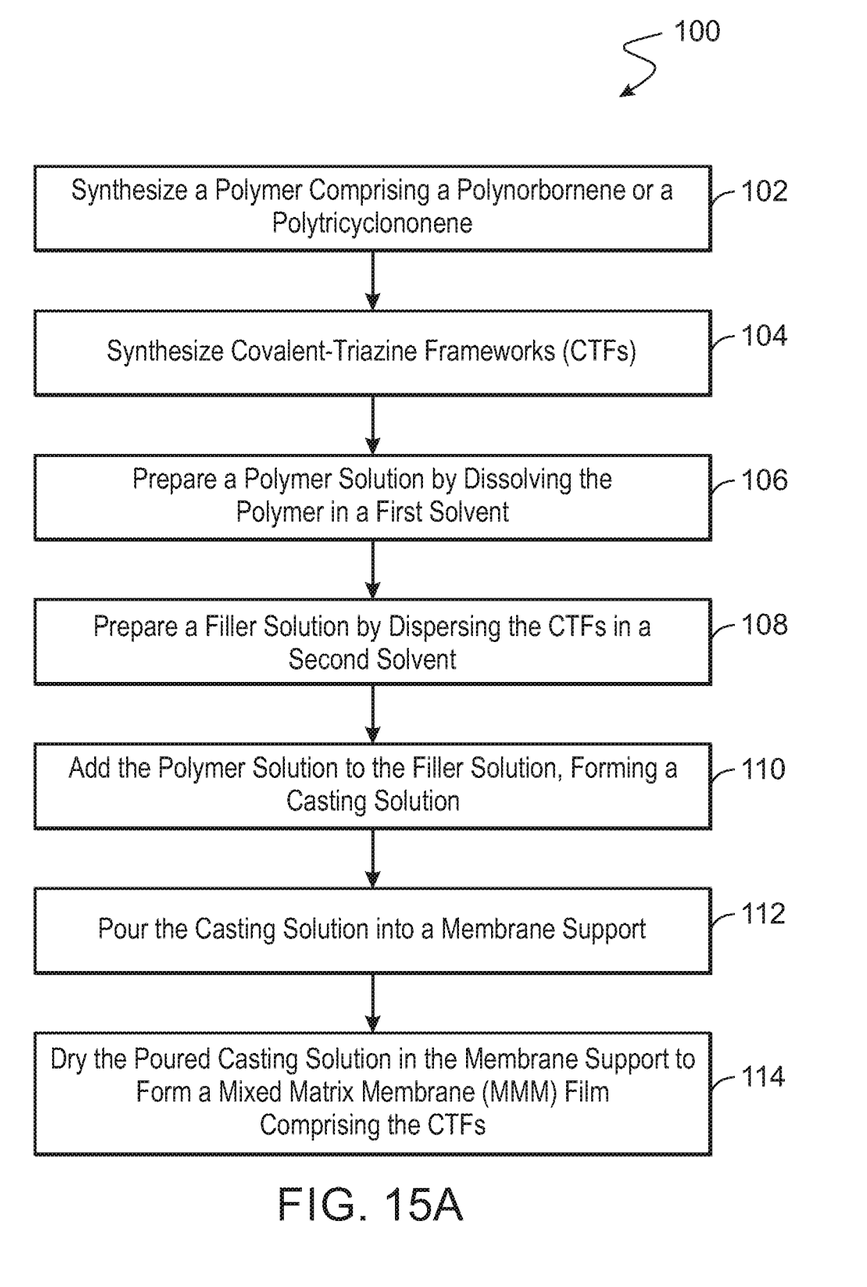
FIGS. 15A-15B are process flow diagrams of the method of making a mixed matrix membrane (MMM) containing CTFs.
Figure 15B:
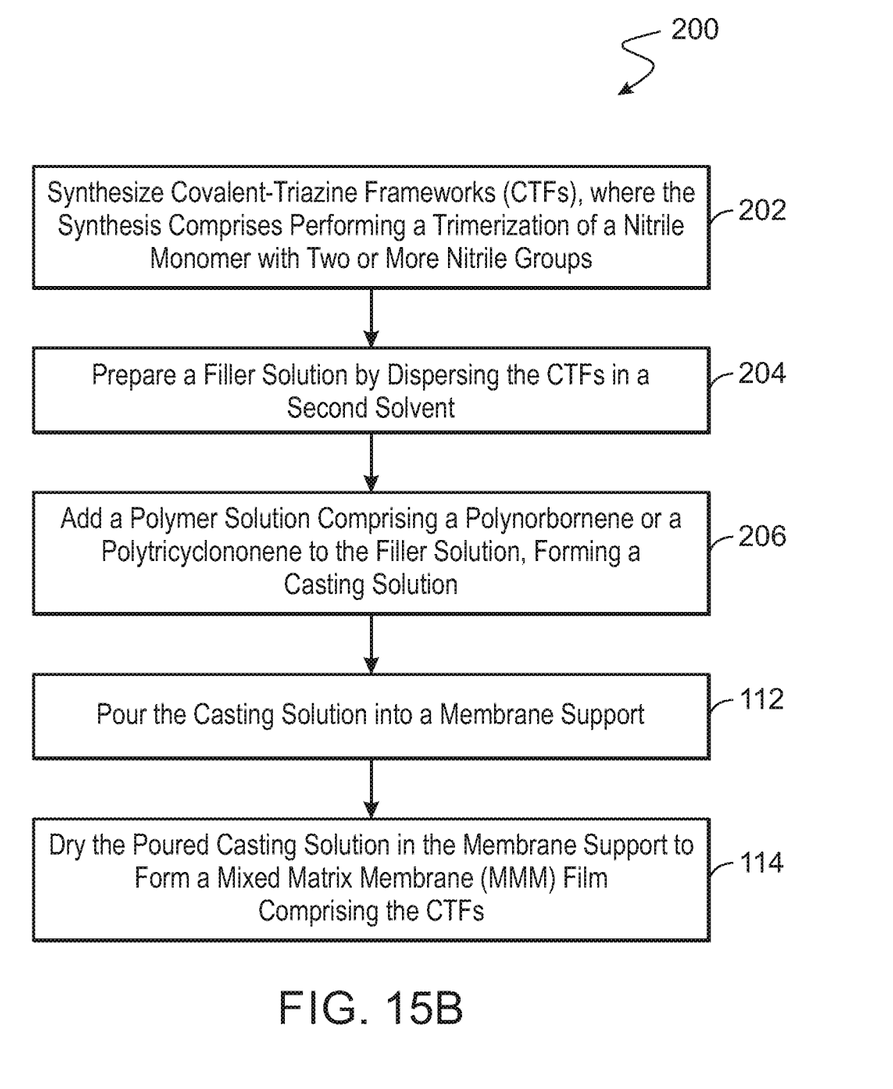

In the following, a scheme of $CO_2$ gas separation using a CTF-MMM is described referring to FIG. 1. Various example molecular building blocks, e.g., norbornene, polynorbornene, and polytricyclononene, for a polymer matrix for the CTF-MMM are described in FIGS. 2-5. Example synthetic pathways for these building blocks are then described referring to FIGS. 6-10. There are two possible polymerization pathways for norbornene or its derivatives: vinyl addition polymerization and ring-opening metathesis polymerization (ROMP). Vinyl addition polymerization proceeds with consumption of the double bond in the cyclohexene ring while preserving the bicyclic structure of the norbornene. This synthetic approach is described referring to FIGS. 3-4 and 6-7. In ROMP, on the other hand, the cyclohexene ring is opened, forming an unsaturated vinylenes with double bonds in the main polymer chain. The ROMP approach is described below referring to FIGS. 5 and 8-10. Subsequently, the structure and synthesis of various CTFs are described referring to FIGS. 11-14. FIGS. 15A-15B are example process flow diagrams for the method of making a CTF-MMM. Covalent triazine frameworks-containing mixed matrix membrane (CTF-MMM) for $CO_2$ separation.

Figure 1:
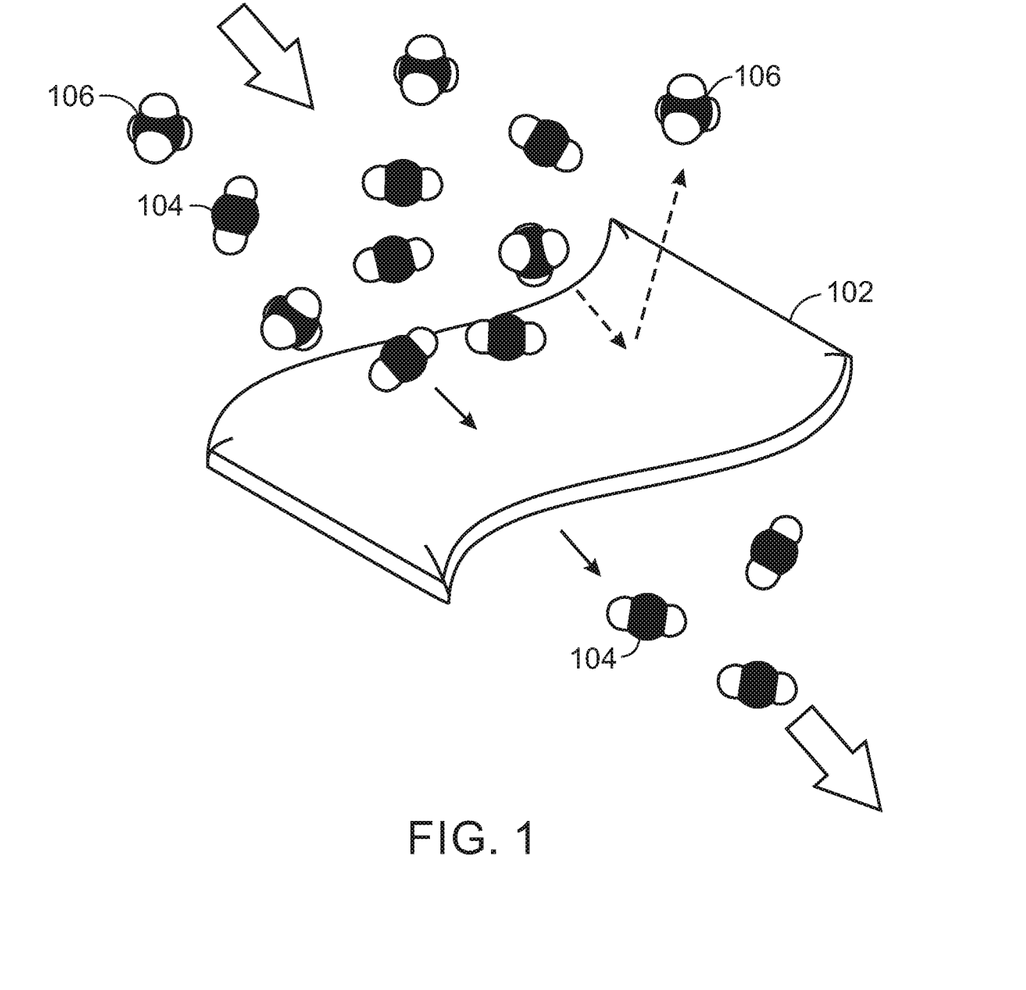
FIG. 1 is a $CO_2$ gas separation using a mixed matrix membrane (MMM).

In FIG. 1, a general scheme of $CO_2$ gas separation using a CTF-MMM 102 is illustrated. In various implementations, a gas mixture containing $CO_2$ and hydrocarbons such as methane ($CH_4$) is processed with the CTF-MMM 102, where $CO_2$ molecules 104 permeates the CTF-MMM 102 while $CH_4$ molecules 106 are rejected. The CTF-MMM 102 can also exhibit $CO_2$ selectivity over other gases such as nitrogen ($N_2$) and other hydrocarbons.

In some implementations, the CTF-MMM is used for $CO_2$ separation from natural gas. For example, it can be applied at a wellhead between a subsurface reservoir section and a surface production section. Raw natural gas has a widely variable composition, depending on reservoir source, but is generally composed of methane ($CH_4$) as the major component mixed with other light hydrocarbons, such as ethane and propane, along with heavier hydrocarbons. In addition, the gas contains water, $CO_2$, hydrogen sulfide ($H_2S$), helium (He), and nitrogen ($N_2$) at varying concentrations. Majority of these impurities including heavy hydrocarbons, $CO_2$, $H_2S$, He, $N_2$, and others must be removed from the raw natural gas to meet the pipeline transportation quality standards, to enhance gas calorific values for fuel consumers, and to avoid equipment and pipeline corrosion. Accordingly, on-site separation and utilization of $CO_2$ from natural gas such as $CO_2$-enhanced oil recovery, storage in deep saline aquifers, and others are desirable to minimize local pipeline corrosion, diminish overall carbon footprint, and increase oil production. In addition, the flow back after $CO_2$ fracturing/stimulation generates more $CO_2$ production that might be challenging to handle at surface due to the designed $CO_2$ capacity of the separation plant.

The CTF-MMM can be installed as a part of the gas separation unit downstream of the wellhead to selectively permeate the high throughput of $CO_2$ gas on-site during the production of natural gas. The remainder of raw natural gas, e.g., $CH_4$ and other hydrocarbons, can be rejected by the CTF-MMM. The $CO_2$ gas separated by the CTF-MMM can be further purified, transported, and sent to sequestration. In some implementations, the $CO_2$ gas is instead sent to further processing units to convert into valuable chemicals.

Norbornene as Core Structure

Figure 2:
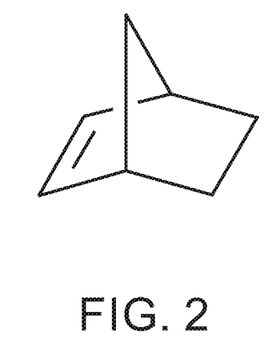
FIG. 2 is a chemical structure of norbornene.

In various implementations, the polymer matrix of a CTF-MMM includes a polynorbornene or polytricyclononene, both of which can be synthesized from norbornene or its derivatives. As illustrated in FIG. 2, norbornene is a highly strained bridged cyclic hydrocarbon with a chemical formula of $C_7H_{10}$. Norbornene has a cyclohexene ring with a methylene bridge. Norbornene derivatives refer to any molecules with additional chemical structures attached to the cyclohexene ring of norbornene. These molecules can be used as monomers to prepare the polymer matrix. In various implementations, the norbornene derivatives are used as monomers to provide structural stability of the polymer, improvement of membrane performance, or both.

Figure 3:
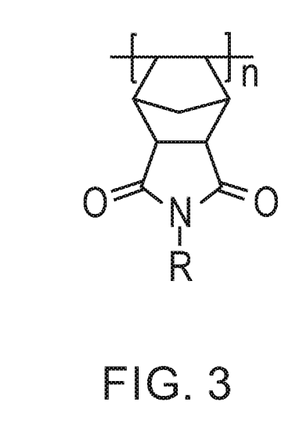
FIG. 3 is a unit structure of a nadimide derivative of polynorbornene.
Figure 4:
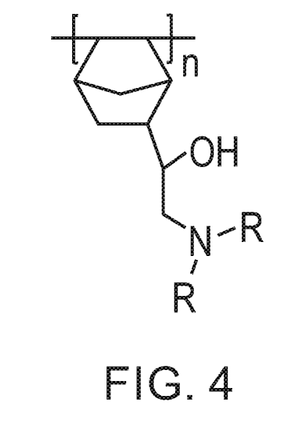
FIG. 4 is a unit structure of a substituted polynorbornene with a tertiary amine group.
Figure 5:
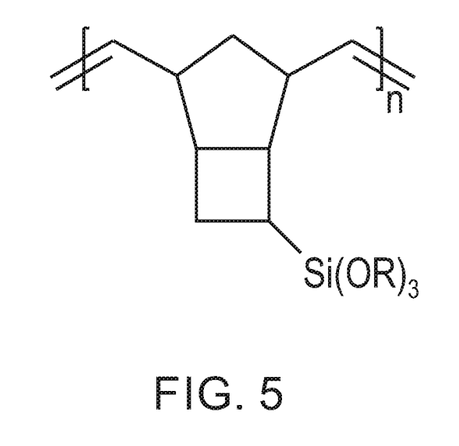
FIG. 5 is a unit structure of a polytricyclononene with an alkoxysilane group.

Depending on the synthetic approach used, the resulting polymer can be either polynorbornene via vinyl addition polymerization or polytricyclononene via ROMP. For example, FIG. 3 illustrates a unit structure of a nadimide derivative of polynorbornene in accordance with an implementation, FIG. 4 illustrates a unit structure of a substituted polynorbornene with a tertiary amine group in accordance with another implementation, and FIG. 5 illustrates a unit structure of a polytricyclononene with an alkoxysilane group in accordance with yet another implementation.

In various implementations, not only the structure of the main chain but also the nature and number of substituents in the monomer unit, substituted norbornene unit, have a significant effect on the properties of the resulting polymer, in particular on gas permeability. Two examples of substituted polynorbornene and one example of polytricyclononene are described below. However, other polymer structures and synthetic methods can also be implemented to obtain a polymer that benefits the gas permeability while maintaining the sufficient gas selectivity, e.g., $CO_2/CH_4$ selectivity. In some implementations, the polymer matrix for the CTF-MMM includes a copolymer made from more than one monomer type. For example, more than one norbornene derivatives can be used as monomers, or one norbornene derivative can be used with a non-norbornene comonomer.

Synthesis of Polynorbornene for Polymer Matrix

Figure 6:
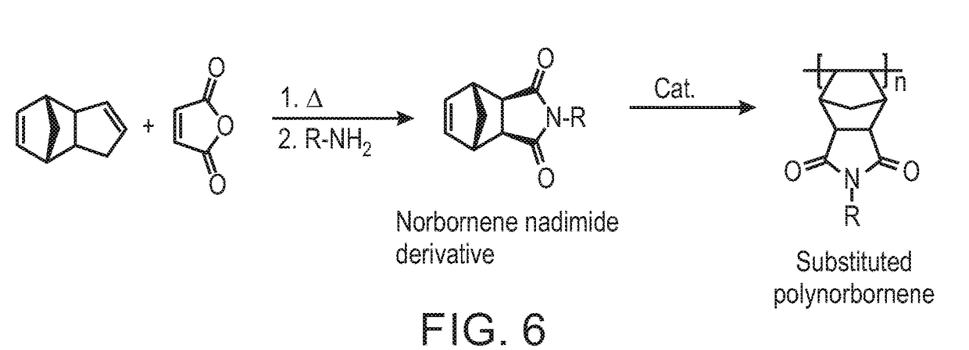
FIG. 6 is a synthesis of a nadimide derivative of polynorbornene.

In some implementations, a norbornene derivative having an imide group, e.g., norbornene nadimide, can be used as monomers. The resulting substituted polynorbornene can be a nadimide derivative of polynorbornene. FIG. 6 illustrates an example of synthetic approach for this nadimide derivative. As illustrated in FIG. 6, the dicyclopentadiene and maleic anhydride can be used as starting materials. The dicyclopentadiene can be depolymerized upon heating into cyclopentadiene, which can then react with the maleic anhydride with the formation of nadic anhydride. The nadic anhydride can subsequently react with a primary amine derivative with the chemical formula $R-NH_2$, where R can be, for example, an alkyl, aryl, cycloalkyl, alkylsilyl, alkoxy, aryloxy, alkoxysilyl or fluoroorganic group. As a result, norbornene nadimide derivative can be obtained. As further illustrated in FIG. 6 on the right, the norbornene nadimide derivative can be polymerized via vinyl addition polymerization.

Figure 7:
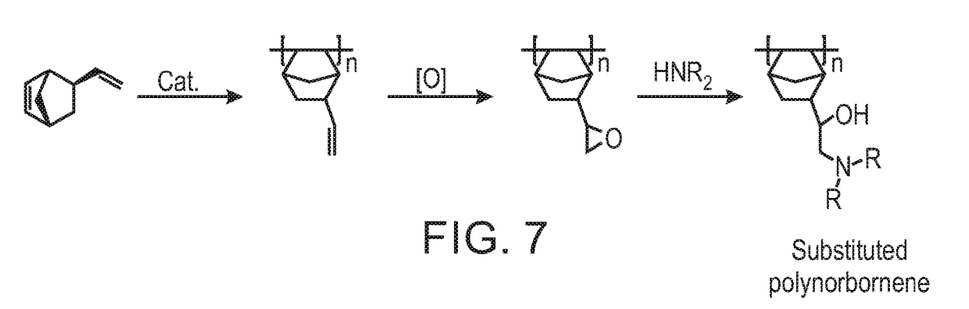
FIG. 7 is a synthesis of a substituted polynorbornene with a tertiary amine group.

In other implementations, a norbornene derivative having an amine group, e.g., tertiary amine group, can be used as monomers. For example, as illustrated in FIG. 7, the norbornene derivative can be synthesized starting with 5-vinyl-2-norbornene. First, the 5-vinyl-2-norbornene can be polymerized via vinyl addition polymerization, for example, using a three-component catalyst system. In an implementation, the catalyst system includes N-heterocyclic carbene Pd-complex activated with sodium tetrakis(3,5-bis(trifluoromethyl)phenyl)borate (Na-BARF), $Na^+[B(3,5-(CF_3)_2C_6H_3)_4]^-$, in the presence of tricyclohexylphosphine ($PCy_3$). During this polymerization stage, only the endocyclic double bond of the cyclohexene ring can be involved in the polymerization, while the exocyclic double bond of the vinyl group can remain intact. At the second stage, the exocyclic vinyl group can be epoxidated in the presence of meta-chloroperoxybenzoic acid. At the final stage, the polymer with the epoxy groups reacts with an amine, e.g., a secondary amine $HNR_2$, where R can include, for example, an alkyl, aryl, cycloalkyl, alkoxy, aryloxy, perfluoroalkyl group, or any combination thereof. Accordingly, the resulting polymer, as illustrated in FIG. 7, can be a substituted polynorbornene with a tertiary amine group.

In some implementations, the use of substituted polynorbornene and the inclusion of an imide or amine group in the polymer for the polymer matrix can improve the affinity of the CTF-MMM to $CO_2$ and thereby its membrane performance. While the implementations described referring to FIGS. 3-4 and 6-7 represent the polymers with one imide or amine group per unit norbornene structure, it is possible to introduce more than one functional group per unit.

Synthesis of Polytricyclononene for Polymer Matrix

Figure 8:
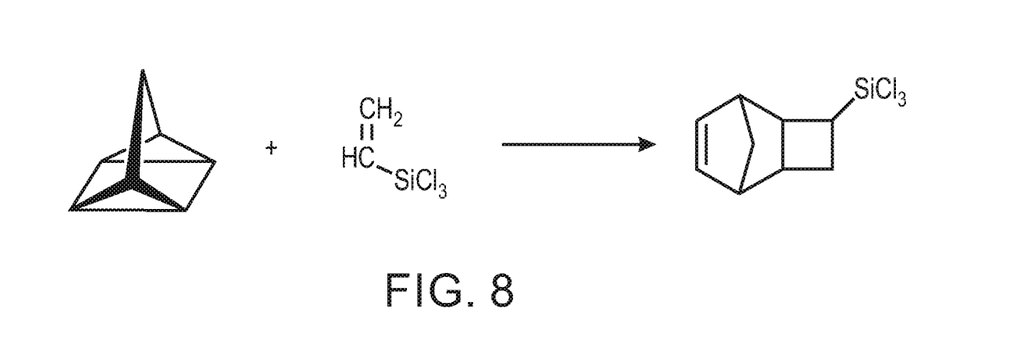
FIG. 8 is a synthesis of a tricyclononene-silicon trichloride ($TCNSiCl_3$)
Figure 9:
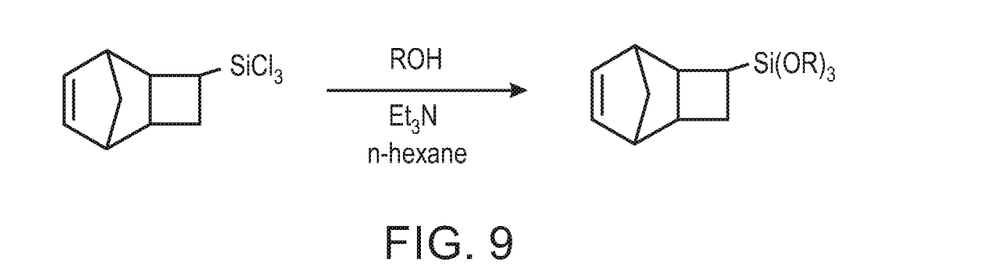
FIG. 9 is a synthesis of a tricyclononene-silicon alkoxide ($TCNSi(OR)_3$) from ($TCNSiCl_3$)
Figure 10:
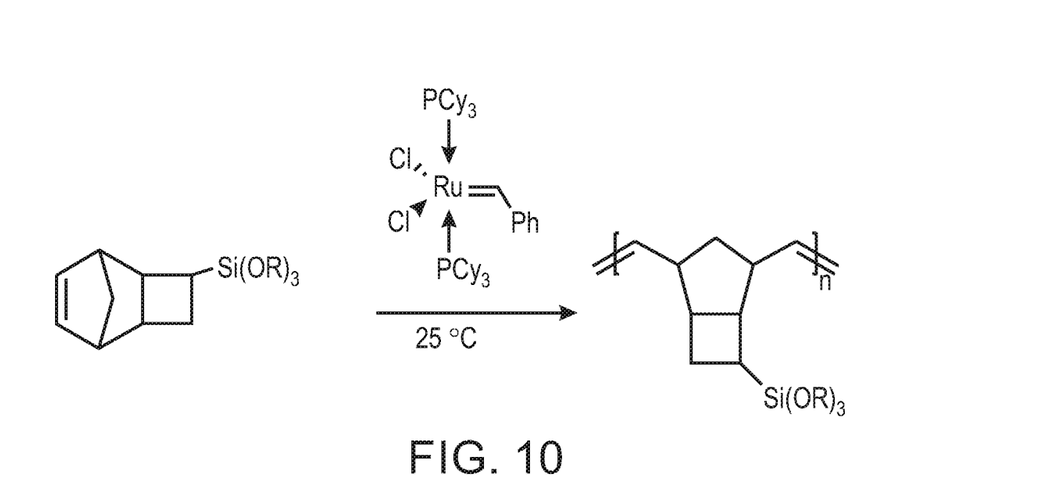
FIG. 10 is a ring-opening metathesis polymerization of $TCNSi(OR)_3$.

Further, ring opening metathesis polymerization (ROMP) of norbornene derivatives can be applied to synthesize a polytricyclononene useful for the polymer matrix in a CTF-MMM. In some implementations, the polytricyclononenes with an alkoxysilane group is synthesized as illustrated in FIGS. 8-10. For example, as illustrated in FIG. 8, the first stage of the synthesis is [2σ+2σ+2π]-cycloaddition of trichlorovinylsilane ($CH_2CHSiCl_3$) to quadricyclane to form tricyclononene-$SiCl_3$ ($TCNSiCl_3$). Subsequently, as illustrated in FIG. 9, the $TCNSiCl_3$ is reacted with an alcohol to form tricyclononene-$(OR)_3$ ($TCNSi(OR)_3$), where R can include but not limited to an alkyl, aryl, cycloalkyl, alkylsilyl, alkoxy, aryloxy, or perfluoroalkyl group. FIG. 10 illustrates the final polymerization stage by ROMP of the $TCNSi(OR)_3$ with one or more Grubbs catalysts. In some implementations, the Grubbs catalysts include transition metal carbene complexes such as ruthenium (Ru). The cyclohexene ring of the $TCNSi(OR)_3$ is opened to form an unsaturated polytricyclopentylene vinylenes with double bonds in the main polymer chain as illustrated in FIG. 10. This polytricyclononene can be used for the polymer matrix in the CTF-MMM.

Although not wishing to be limited by any theory, ROMP of norbornene without any substituted groups may result in a polynorbornene with poor stability, which in turn leads to a challenge in long-term gas separation performance. To address this issue, substituents can be introduced to the norbornene unit, e.g., trimethylsilyl or trialkoxysilane group as illustrated in FIG. 10. These substituents can increase the gas permeation properties and thermal stability of the polymer matrix and thereby the final CTF-MMM.

Covalent Triazine Frameworks (CTFs) for Porous Fillers

Figure 11:
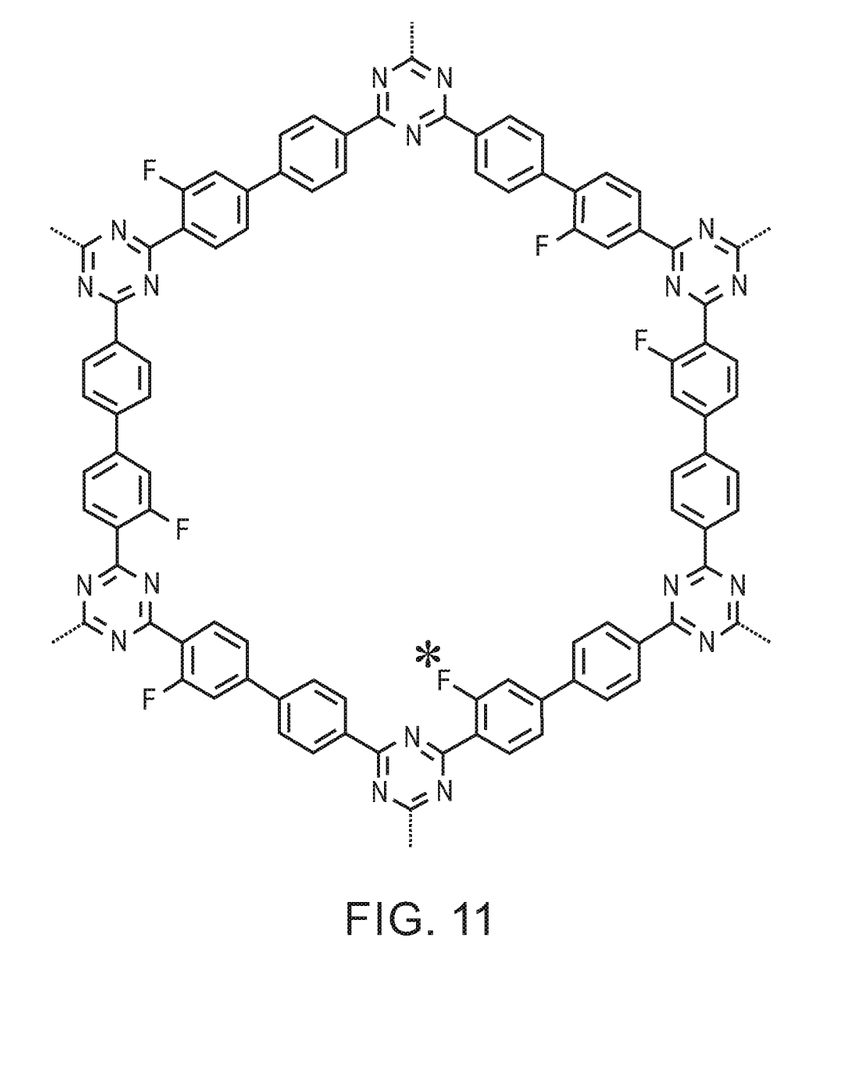
FIG. 11 is a partial chemical structure of fluorine-containing covalent triazine frameworks (CTFs).

In various implementations, CTFs are used as porous fillers in the MMM. In general, CTFs refer to a class of organic polymer materials having aromatic 1,3,5-triazine rings as their core unit. The chemical structure of CTFs has a wide variety depending on the building blocks that link the triazine rings. FIG. 11 illustrates an example of a partial chemical structure of fluorine-containing CTFs, where each triazine ring is linked to three fluorinated biphenyl groups. Typical linkages between the triazine rings include aromatics rings, and thereby providing CTFs with planar π-conjugation properties and chemical stability. With its highly ordered two-dimensional framework structures, e.g., a hexagonal unit illustrated in FIG. 11, CTFs are generally porous, making them a promising candidate for applications in gas adsorption/separation and catalysis, including $CO_2$ membrane separation. Some potential advantages of CTFs in $CO_2$ separation, particularly at wellhead and other oil and gas production facilities, are materials stability under high pressure and high temperature (HPHT) conditions and maintained $CO_2$ capture capacity even at humid conditions. The properties of monomer units and the type of bonding between them significantly influence the structure and properties of the resulting CTFs such as crystallinity, surface area, porosity, and chemical stability.

In general, synthetic methods for CTFs can be classified into two categories: (1) trimerization to form triazine units and (2) polymerization of triazine-based monomers. The first approach includes methods such as ionothermal synthesis, superacid synthesis, hard-template assisted synthesis, aromatic amide condensation, and microwave-assisted synthesis. The second approach includes methods based on the Schiff base reaction, Friedel-Crafts reaction, nucleophilic substitution reaction, coupling reaction, and amine-dianhydride condensation. In the following, the two examples of the trimerization approach and one example of the triazine monomer approach are described referring to FIGS. 12-14.

Figure 12:
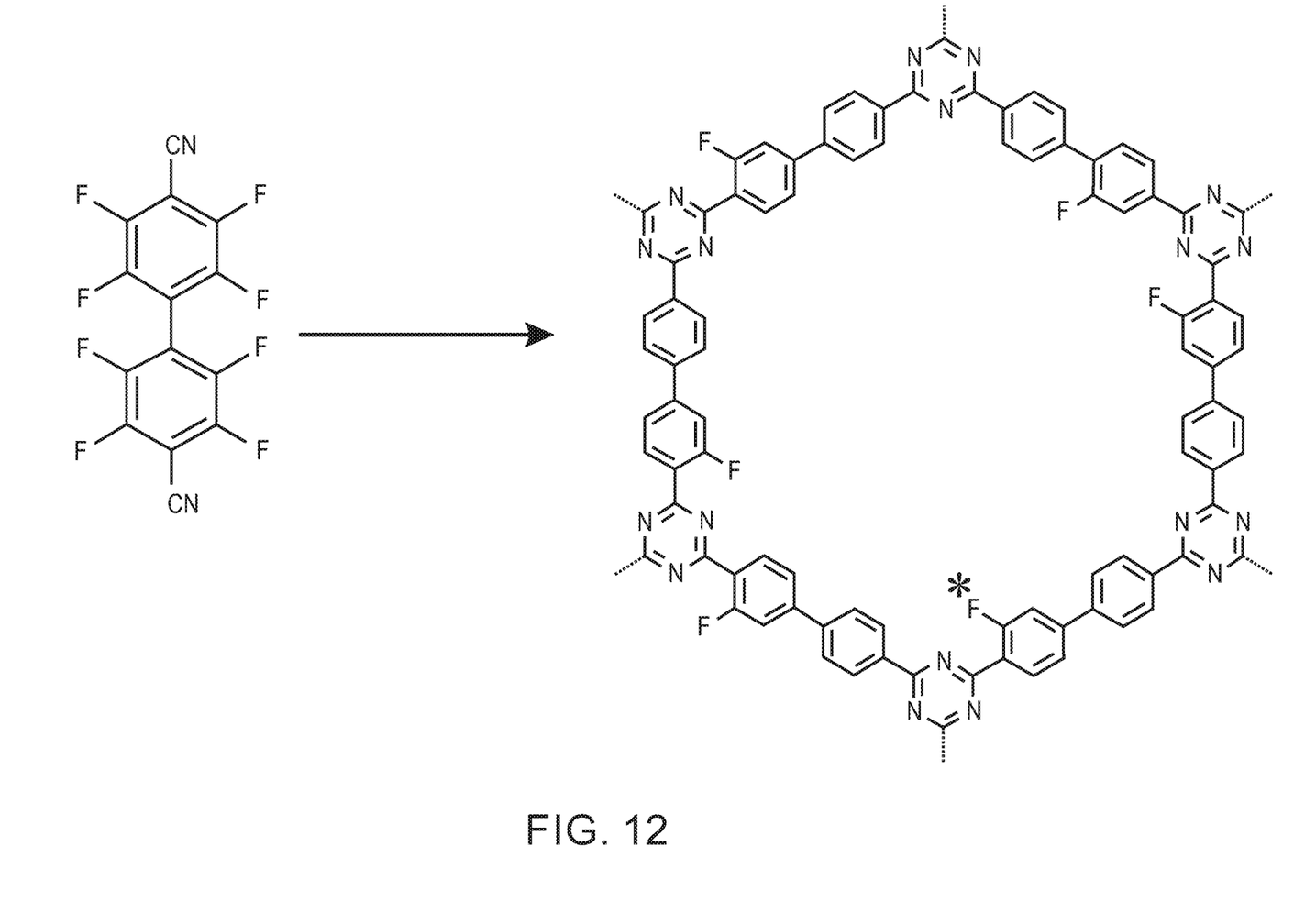
FIG. 12 is a synthesis of CTFs by trimerization of 2,2',3,3',5,5',6,6'-octafluoro-4,4'-biphenyldicarbonitrile (F-DCBP).

In FIG. 12, in accordance with an implementation, CTFs are synthesized by the trimerization of 2,2',3,3',5,5',6,6'-octafluoro-4,4'-biphenyldicarbonitrile (F-DCBP). In an implementation, the trimerization is performed under ionothermal conditions at 400° C. in the presence of $ZnCl_2$ as a molten Lewis acid catalyst. The ratio of the F-DCBP to $ZnCl_2$ can be varied between 5 and 10. During the polymerization via the trimerization, some defluorination can also occur as illustrated in FIG. 12, resulting in the fluorine content in the CTFs less than the theoretical amount based on the F-DCBP. In an implementation, the retention of the fluorine is about 10% of the theoretical amount. The fluorinated monomer, F-DCBP, can be synthesized from pentafluoro-benzonitrile in the presence of anhydrous diethyl ether as solvent and hexaethyl phosphorous triamide.

Figure 13:
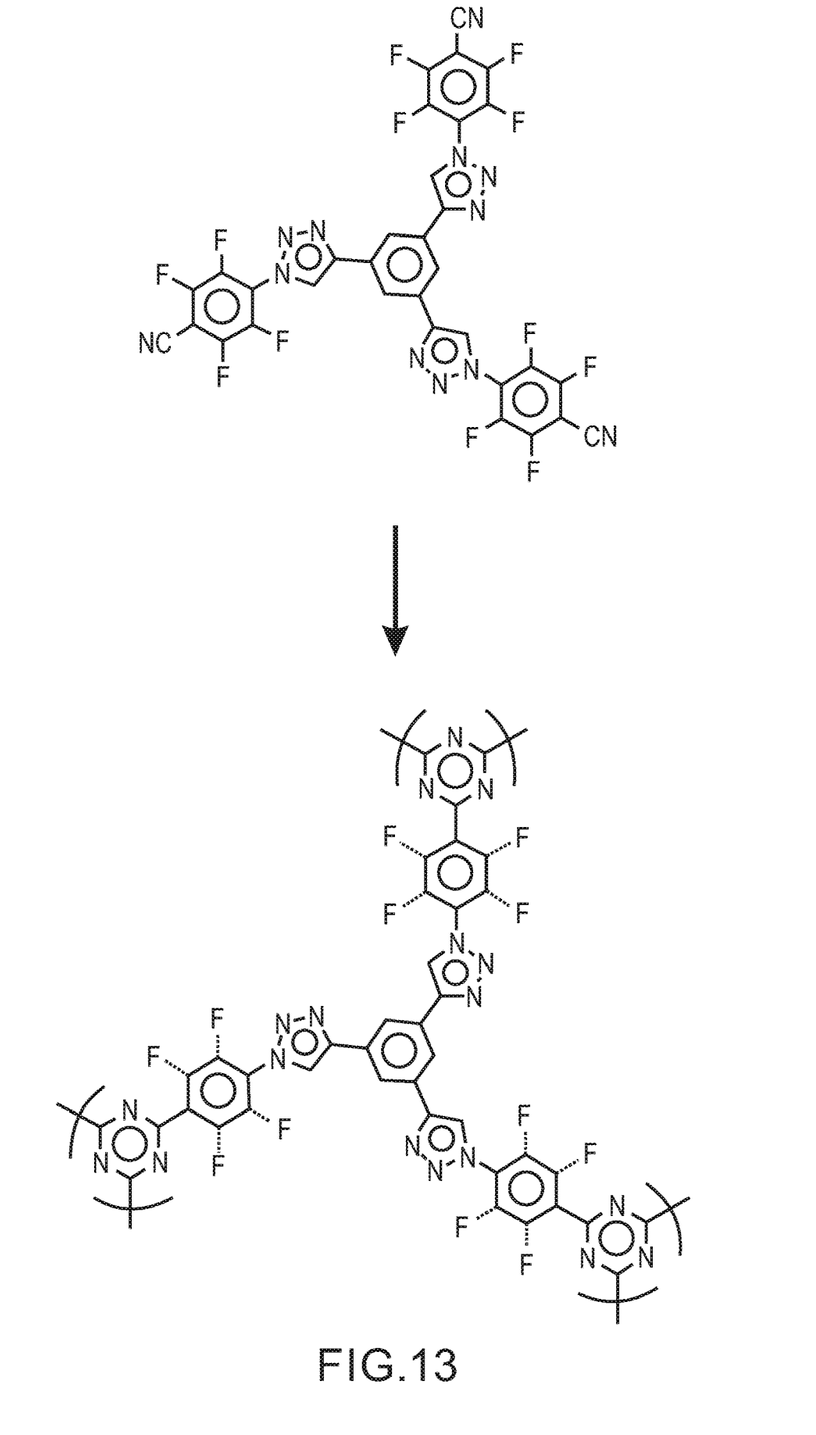
FIG. 13 is a synthesis of CTFs by trimerization of triazole-functionalized perfluorinated aromatic trinitrile (Tz-PFCN).

In FIG. 13, in accordance with another implementation, CTFs are synthesized by the trimerization of triazole-functionalized perfluorinated aromatic trinitrile (Tz-PFCN). The Tz-PFCN can be synthesized by the Cu(I)-catalyzed click reaction via reaction of 1,3,5-triethynylbenzene and 4-azidotetrafluorobenzonitrile. Similar to the previous implementation, the trimerization can be performed under ionothermal conditions, for example, in the presence of anhydrous $ZnCl_2$ with the molar ratio of the Tz-PFCN to $ZnCl_2$ about 10. The reaction temperature can be between 400° C. and 600° C.

In addition to trimerization, the polymerization of triazine-based monomers can be applied to synthesize CTFs. In an implementation, as illustrated in FIG. 14, condensation of cyanuric chloride and 1,4-phenylenediamine, for example in an inert argon environment, can form CTFs with amine groups outside the triazine cores. Further functionalization of the CTFs can also be performed, for example, by reacting the CTFs with monoethanolamine at about 358.15 K for 3 days.

In various implementations, the CTFs are further modified after the polymerization stage to incorporate additional functional groups. Examples of the additional functional groups include amine-, silyl-, and fluorinated moieties, which can further enhance the $CO_2$ affinity of the CTFs, improve the dispersion in polymeric matrix, or both.

Incorporating CTFs in MMM

After the synthesis of the polymer matrix and the CTFs as described above, a mixed membrane matrix (MMM) can be prepared by dispersing the CTFs in the polymer matrix. In various implementations, the preparation method generally includes steps of preparing a polymer solution and a filler solution, followed by adding the polymer solution into the filler solution and casting it to form a membrane film. The polymer, e.g., polynorbornene or polytricyclononene, and CTFs can be dispersed in suitable solvents, e.g., toluene, chloroform, and dichromethane. Suitable solvents can be selected in view of the solubility, dispersibility, miscibility, and other factors. Two different solvent systems can be used for dissolving the polymer matrix and for dispersing the CTFs. Alternatively, the same solvent system can be used for both. The polymer solution can then be filtered through a 0.2 or 0.45-μm pore size filter for microfiltration. The filler solution containing the CTFs can be sonicated for about one to several hours for dispersion. The polymer solution can then be slowly added, e.g., dropwise, to the dispersion of CTFs under vigorous stirring and sonication to yield a casting solution. In some implementations, the filler to polymer ratio is between about 0.01 wt. % and about 30 wt. %. The casting solution can be poured to a membrane support and slowly dried to result a solid membrane film. In an implementation, solvent exchange is optionally performed using a boiling point solvent, e.g., methanol, which helps releasing the pores of the CTFs. The solid membrane film can then be dried in vacuum at an elevated temperature to remove the residual solvent, forming a final CTF-MMM.

In some implementations, a mixture of more than one polymer materials is used for the polymer matrix, where at least one component includes polynorbornene or polytricyclononene. Further, the porous fillers can be prepared using more than one CTFs, or include other porous materials, e.g., inorganic materials, in addition to the CTFs.

FIGS. 15A-15B are example process flow diagrams of a method of making a CTF-MMM as described above. In FIG. 15A, a method 100 according to an implementation starts with synthesizing 102 a polymer including a polynorbornene or a polytricyclononene and synthesizing 104 covalent-triazine frameworks (CTFs). Subsequently, a polymer solution is prepared 106 by dissolving the polymer in a first solvent and a filler solution is prepared 108 by dispersing the CTFs in a second solvent. The polymer solution is then added 110 to the filler solution while stirring the filler solution, forming a casting solution. The casting solution is poured 112 into a membrane support, followed by drying 114 the poured casting solution in the membrane support to form the CTF-MMM.

In FIG. 15B, another method 200 according to an implementation starts with synthesizing 202 covalent-triazine frameworks (CTFs), where the synthesis includes performing a trimerization of a nitrile monomer with two or more nitrile groups. Subsequently, a filler solution is prepared 204 by dispersing the CTFs in a solvent, followed by adding 206 a polymer solution containing a polynorbornene or a polytricyclononene to the filler solution while stirring the filler solution to form a casting solution. The casting solution is then poured 112 into a membrane support, and the poured casting solution is dried 114 in the membrane support to form the CTF-MMM.

Implementations

An implementation described herein provides a method of synthesizing a mixed matrix membrane (MMM) film, where the method includes: synthesizing a polymer including a polynorbornene or a polytricyclononene; synthesizing covalent-triazine frameworks (CTFs); preparing a polymer solution by dissolving the polymer in a first solvent; preparing a filler solution by dispersing the CTFs in a second solvent; adding the polymer solution to the filler solution while stirring the filler solution, forming a casting solution; pouring the casting solution into a membrane support; and drying the poured casting solution in the membrane support to form the MMM film including the CTFs.

In an aspect, combinable with any other aspect, the synthesizing of the polymer includes performing a vinyl addition polymerization process using a norbornene nadimide derivative as a monomer.

In an aspect, combinable with any other aspect, the synthesizing of the polymer includes performing a polymerization process using a 5-vinyl-2-norbornene as a monomer.

In an aspect, combinable with any other aspect, the synthesizing of the polymer includes: performing a polymerization process using a norbornene derivative including an exocyclic vinyl group as a monomer, forming an intermediate polynorbornene including the exocyclic vinyl group; performing an epoxidation of the exocyclic vinyl group of the intermediate polynorbornene to form an epoxide group; and reacting the epoxide group with a secondary amine to form the polynorbornene, which includes an amine group.

In an aspect, combinable with any other aspect, the synthesizing of the polymer includes: synthesizing a tricyclononene derivative including an alkoxysilane group; and performing a ring-opening metathesis polymerization process using the tricyclononene as a monomer to form the polytricyclononene.

Another implementation described herein provides a method of synthesizing a mixed matrix membrane (MMM) film, where the method includes: synthesizing covalent-triazine frameworks (CTFs), the synthesizing including performing a trimerization of a nitrile monomer, the nitrile monomer including two or more nitrile groups; preparing a filler solution by dispersing the CTFs in a solvent; adding a polymer solution including a polynorbornene or a polytricyclononene to the filler solution while stirring the filler solution, forming a casting solution; pouring the casting solution into a membrane support; and drying the poured casting solution in the membrane support to form the MMM film including the CTFs.

In an aspect, combinable with any other aspect, the nitrile monomer is a biphenyldicarbonitrile derivative.

In an aspect, combinable with any other aspect, the nitrile monomer is 2,2',3,3',5,5',6,6'-octafluoro-4,4'-biphenyldicarbonitrile (F-DCBP).

In an aspect, combinable with any other aspect, the nitrile monomer includes a triazole structure.

In an aspect, combinable with any other aspect, the nitrile monomer is a triazole-functionalized perfluorinated aromatic trinitrile (Tz-PFCN).

Another implementation described herein provides a mixed matrix membrane (MMM) including: a polymer matrix (PM) including a polynorbornene or a polytricyclononene; and a filler dispersed in the PM, the filler including covalent-triazine frameworks (CTFs).

In an aspect, combinable with any other aspect, the PM includes an imide group.

In an aspect, combinable with any other aspect, the PM includes a polynorbornene with a norbornene nadimide structure.

In an aspect, combinable with any other aspect, the PM includes an amine group.

In an aspect, combinable with any other aspect, the PM includes a polynorbornene including an amine group.

In an aspect, combinable with any other aspect, the PM includes the polynorbornene, which is synthesized using a vinyl addition polymerization process with a 5-vinyl-2-norbornene as a monomer.

In an aspect, combinable with any other aspect, the PM includes a polytricyclononene including an alkoxysilane group.

In an aspect, combinable with any other aspect, the CTFs include fluorine.

In an aspect, combinable with any other aspect, the CTFs include a fluorinated-biphenyl structure.

In an aspect, combinable with any other aspect, the CTFs include a triazole unit.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:
1. A method of synthesizing a mixed matrix membrane (MMM) film, the method comprising:
synthesizing a polymer comprising a polynorbornene or a polytricyclononene;
synthesizing covalent-triazine frameworks (CTFs);
preparing a polymer solution by dissolving the polymer in a first solvent;

preparing a filler solution by dispersing the CTFs in a second solvent;

adding the polymer solution to the filler solution while stirring the filler solution, forming a casting solution;

pouring the casting solution into a membrane support; and drying the poured casting solution in the membrane support to form the MMM film comprising the CTFs.

2. The method of claim 1, wherein the synthesizing of the polymer comprises performing a vinyl addition polymerization process using a norbornene nadimide derivative as a monomer.

3. The method of claim 1, wherein the synthesizing of the polymer comprises performing a polymerization process using a 5-vinyl-2-norbornene as a monomer.

4. The method of claim 1, wherein the synthesizing of the polymer comprises:

performing a polymerization process using a norbornene derivative comprising an exocyclic vinyl group as a monomer, forming an intermediate polynorbornene comprising the exocyclic vinyl group;

performing an epoxidation of the exocyclic vinyl group of the intermediate polynorbornene to form an epoxide group; and reacting the epoxide group with a secondary amine to form the polynorbornene, which comprises an amine group.

5. The method of claim 1, wherein the synthesizing of the polymer comprises:

synthesizing a tricyclononene derivative comprising an alkoxysilane group; and performing a ring-opening metathesis polymerization process using the tricyclononene as a monomer to form the polytricyclononene.

6. A method of synthesizing a mixed matrix membrane (MMM) film, the method comprising:

synthesizing covalent-triazine frameworks (CTFs), the synthesizing comprising performing a trimerization of a nitrile monomer, the nitrile monomer comprising two or more nitrile groups;

preparing a filler solution by dispersing the CTFs in a solvent;

adding a polymer solution comprising a polynorbornene or a polytricyclononene to the filler solution while stirring the filler solution, forming a casting solution;

pouring the casting solution into a membrane support; and drying the poured casting solution in the membrane support to form the MMM film comprising the CTFs.

7. The method of claim 6, wherein the nitrile monomer is a biphenyldicarbonitrile derivative.

8. The method of claim 6, wherein the nitrile monomer is 2,2',3,3',5,5',6,6'-octafluoro-4,4'-biphenyldicarbonitrile (F-DCBP).

9. The method of claim 6, wherein the nitrile monomer comprises a triazole structure.

10. The method of claim 6, wherein the nitrile monomer is a triazole-functionalized perfluorinated aromatic trinitrile (Tz-PFCN).

11. A mixed matrix membrane (MMM) comprising:

a polymer matrix (PM) comprising a polynorbornene or a polytricyclononene; and a filler dispersed in the PM, the filler comprising covalent-triazine frameworks (CTFs).

12. The MMM of claim 11, wherein the PM comprises an imide group.

13. The MMM of claim 11, wherein the PM comprises a polynorbornene with a norbornene nadimide structure.

14. The MMM of claim 11, wherein the PM comprises an amine group.

15. The MMM of claim 11, wherein the PM comprises a polynorbornene comprising an amine group.

16. The MMM of claim 11, wherein the PM comprises the polynorbornene, which is synthesized using a vinyl addition polymerization process with a 5-vinyl-2-norbornene as a monomer.

17. The MMM of claim 11, wherein the PM comprises a polytricyclononene comprising an alkoxysilane group.

18. The MMM of claim 11, wherein the CTFs comprise fluorine.

19. The MMM of claim 11, wherein the CTFs comprise a fluorinated-biphenyl structure.

20. The MMM of claim 11, wherein the CTFs comprise a triazole unit.

* * * * *